Patented May 8, 1934

1,957,856

UNITED STATES PATENT OFFICE 1,957,856

MANUFACTURE OF MIXED CELLULOSE ESTERS

Cyril J. Staud and Charles Sterling Webber, Rochester, N. Y., assignors to Eastman Kodak Company, Rochester, N. Y., a corporation of New York No Drawing. Application February 18, 1929, Serial No. 341,032

19 Claims. (Cl. 260—101)

This invention relates to cellulose esters and particularly to double esters including an acyl radical.

Cellulose acetate is a well known ester. The exact constitution of this ester is not known. It has been definitely shown, however, that cellulose has three hydroxyl groups per $C_6H_{10}O_5$, all of which are esterifiable with acetic anhydride in the presence of a catalyst. When fully acetylated a cellulose triacetate results which is insoluble in most of the usual solvents for cellulose esters. The only practicable solvent is chloroform, which is too expensive for most commercial purposes. To make the ester available, it is customary to subject it to a partial hydrolysis to remove one or more of the acetyl radicals, the ester being then soluble in acetone—a relatively cheap commercial solvent. Triacetyl cellulose contains 44.8% of acetyl. Depending upon the extent of hydrolysis, the acetyl content of the ester may be varied from the triacetate to the regenerated cellulose which contains 0% acetyl. While the hydrolyzed ester, usually employed, contains approximately 38% acetyl, is soluble in acetone and is thus available for some purposes, it is not soluble in many solvents and in particular is insoluble in water. The esters containing lower percentages of acetyl have little commercial value at the present time. Consequently, the uses of the ester are comparatively limited.

The object of the present invention is to provide hitherto unknown mixed cellulose esters containing an acyl radical and an alpha hydroxy acid radical which compounds exhibit new and unusual solubility relations.

We have discovered double esters of cellulose including an aliphatic or aromatic acyl radical and a radical of another acid of the group including the mono-basic and di-basic aliphatic alpha hydroxy acids and that such double esters have new and desirable properties which adapt them for commercial applications. These double esters can be prepared by the substitution of the radicals of the acids mentioned, for one or more of the acyl radicals in cellulose ester containing varying proportions of the acyl radical. The substitution may be effected for example by digesting a solution of cellulose acetate in the acid in question for a sufficient period and under conditions which avoid degradation of the cellulose nucleus. The double ester thus prepared may be separated as a solid by precipitation. It may be freed from contaminating materials and prepared thus in a substantially pure condition.

The acids which are adapted for use in preparing double esters are particularly lactic, tartaric, racemic, malic, glycollic, glyceric and mandelic acids. The radicals of these acids for example may be substituted in part for the acetyl radical in triacetyl cellulose or an acetyl cellulose which has been partially hydrolyzed, and the substitution results in a double ester having generally improved characteristics, particularly with respect to solubility. The total esterified hydroxyl in the cellulose may remain the same or be diminished according to the acid used and the amount of water present and the acetyl content of the starting material. The special characteristics of each of the double esters will vary, depending upon the particular radical which is substituted therein and the amount of the substitution effected. The double esters of all of the acids mentioned are, however, generally similar as regards their successive solubility as more of the alpha hydroxy acid radical is introduced and acetyl is removed by displacement or by hydrolysis.

The procedure whereby the substitution is effected will also vary somewhat, depending upon the acid radical to be substituted. It is essential, for example, that the cellulose ester be soluble in the acid employed, and the solubility differs. Thus, in the case of lactic acid, a solution in water having a concentration of 75–85% dissolves cellulose acetate. A 77% solution of tartaric acid in water dissolves cellulose acetate. Glycollic acid is used without the addition of water.

The temperature required is not definitely fixed,—that is to say, the substitution can be effected at a relatively low temperature with a sufficient time factor. If the temperature is higher, reaction is more rapid. Generally speaking, a temperature of about 100° C., is desirable, since rapid conversion is thereby accomplished. The highly concentrated solutions of acid in water will boil well above 100° C., since the boiling point of solutions of slightly ionized solutes is raised 1.52° C., per molecular concentration. A higher temperature may be employed with a corresponding higher pressure, that is to say, if the reaction is conducted in a pressure-resisting vessel. There is apparently no advantage to operation under pressure, and a temperature of about 100° C., is, therefore, desirable.

The time required to complete the reaction will vary widely, depending upon the particular acid radical which is substituted in the cellulose ester and the extent to which the substitution is effected. The water content will also introduce considerable variation in the time required to obtain a product of a desired solubility. The reaction may be satisfactorily completed in 5 or 6 hours or less, or it may require the relatively extended time, that is, 48 hours or more. It is to be understood that esters having varying proportions of the substituted acid radical may be prepared and the products, while differing somewhat in special characteristics, are, nevertheless, similar. Time and other conditions will be modified, therefore, in view of the results which are desired. The constitution of the products is relatively complicated and no attempt will be made, therefore, to indicate the exact arrangement of the groups in the molecule. The products can, however, be analyzed, and analysis shows the presence of varying proportions of the acyl and substituted acid radicals.

The reaction may be conducted in an open flask or vessel. It is necessary that the heating be uniform to avoid charring of the material and it is desirable, therefore, to employ a steam or oil bath, which insures the uniform distribution of the heat and avoids overheating of any part of the mixture. The flask or vessel is provided preferably with an extension serving as a reflux condenser, so that any water separated from the mixture as steam will be condensed and returned thereto. Evaporation of the contents of the flask or vessel is thus avoided.

With this general understanding of the object and nature of the invention, we shall present several specific examples as follows:

*Example I.*—Cellulose triacetate, (acetyl 44.6%) cellulose acetate which has been hydrolyzed to acetone solubility (acetyl 37–40%) or cellulose acetate hydrolyzed to solubility in hot 75% ethyl alcohol (acetyl 33–35%), is dissolved in lactic acid of concentration 75–85% in the proportion of approximately one part by weight of cellulose acetate to four parts of lactic acid. The solution is heated on a steam bath at 100° C., under a reflux condenser until the condensate from the reflux condenser no longer gives a precipitate upon falling back into the solution. The time required is approximately 48 hours. The ester is precipitated in acetone, washed with the same reagent to neutrality and dried. The resulting product is soluble in water and insoluble in acetone. The product after grinding is a fine white powder. A clear solution containing as high as 25% of the ester may be obtained in water.

*Example II.*—Ten grams of cellulose acetate containing 33% acetyl (soluble in hot 75% ethyl alcohol) after drying in an oven at 105° C., are dissolved in a flask containing 50 grams of C. P. glycollic acid. The flask is equipped with an internal reflux condenser and is heated on a steam bath for approximately 10½ hours at approximately 100° C. The ester is precipitated in acetone and washed by repeated decantation until neutral to brom thymol blue. It is soluble in water to give a clear, rather viscous solution.

*Example III.*—Ten grams of cellulose acetate, containing 33% acetyl (soluble in hot 75% ethyl alcohol) which has been dried at 105° C., are dissolved in 50 grams of C. P. tartaric acid with 15 g. of water and heated on a steam bath at approximately 100° C. The acetate dissolves in the tartaric acid solution after 1 to 2 hours. The heating is continued for from 8 to 9 hours. The ester product is precipitated by pouring into acetone. It is washed with acetone by decantation until excess tartaric acid has been removed. The product is a white powder which is very soluble in water, and exceedingly hygroscopic.

*Example IV.*—Five grams of cellulose acetate containing 34.1% acetyl are mixed with 25 grams of 85% glyceric acid, a thick stiff dough is formed which is heated to 100° C., by steam in a flask closed by a stopper carrying a reflux condenser. The heating is continued for 12½ hours at which time the product is precipitated in acetone and washed with acetone by decantation until a portion in an aqueous solution is neutral to litmus. The product gives a clear solution in water.

*Example V.*—Two grams of cellulose acetate containing 34.1% acetyl is digested in a suitable flask containing a reflux condenser with 10 grams of mandelic acid (alpha hydroxyl phenyl acetic acid) at a temperature of 120–130° C. for a period of 3⅓ hours. The product is extracted and washed to neutrality with ether. The resulting cellulose acetate mandelate is insoluble in chloroform, acetone and 85% chloroform alcohol, and soluble in 60% ethylene chloride, methanol or other aliphatic halogenated hydrocarbons with saturated aliphatic alcohols.

*Example VI.*—Ten grams of partially hydrolyzed cellulose acetate (34.1% acetyl or more) are dissolved in a solution of 50 grams of racemic acid C. P. in 37 grams of water and heated by steam at 100° C. Solution of the cellulose acetate results after 3 hours. Digestion at this temperature for a subsequent period of 6½ hours results in a water soluble product. The product is recovered from the solution by precipitation in a large volume of anhydrous acetone. The excessive acid is removed by successive washing with acetone and decantation until a sample is neutral to litmus in aqueous solution.

*Example VII.*—1. A mixed ester of cellulose may be prepared by heating a solution of cellulose acetate in a saturated or nearly saturated solution of d-l malic acid in water at 100° C. or pure l malic acid, the product being a cellulose aceto malate. In the preparation of this product, a progressive change in the solvent properties of the mixed cellulose ester has been observed going thru acetone solubility to a solubility in 75% ethanol water, 50% ethanol water and finally attaining water solubility. The water soluble product is still soluble in mixtures of ethanol and water but insoluble in acetone.

*Example VII.*—2. Ten grams of cellulose acetate containing 34.1% acetyl are dissolved in 50 grams of l malic acid C. P. and heated on a steam bath at 100° C. In 10 hours a water soluble product is obtained.

*Example VII.*—3. Ten grams of cellulose acetate containing 34.1% acetyl are dissolved at 100° C. in 50 grams of d-l malic acid practical grade, to which 5 cc. of water has been added. The material after being heated for 9¼ hours on a steam bath at 100° C. results in a water soluble product.

*Example VII.*—4. Ten grams of cellulose acetate containing 34.1% acetyl are added to 50 grams of d-l malic acid practical dissolved in 15 cc. of water at 100° C. After digestion for 2½ hours at 100° C. a product is obtained after precipitation and purification which is soluble in 50% aqueous ethanol. After digestion for a period of 3½ hours at the same temperature, a water soluble product results.

It will be understood that the substitution of acid radicals of the group mentioned for acetyl in the cellulose acetate approaches an equilibrium beyond which the reaction will not proceed and is never complete, so that a double ester is always obtained. The amount of substitution effected depends upon the conditions including proportions and particularly the time during which the reaction proceeds. The conditions are easily regulated so that it is possible to produce esters with varying proportions of substituted acid radicals. The solubility of the ester in various solvents differs with the character and proportion of the substituted acid radical. When the reaction proceeds for a limited time the product is soluble in acetone. This solubility is realized only when cellulose triacetate is used as a starting material or if it has been partially saponified and an acyl content of greater than 41% is present. If acetone soluble cellulose acetate is employed, containing from 37-42% acetyl, the product becomes very soon insoluble in acetone, and at no subsequent point in the procedure does it again become soluble in this reagent. Also, when cellulose acetate which is soluble in hot 75% aqueous ethanol and contains 30-35% acetyl is used, no products are obtained which are soluble in acetone. Further treatment yields products which are soluble in 75% ethyl alcohol and in 50% ethyl alcohol. When the substitution has progressed to a sufficient extent, the product is soluble in water. It is possible, therefore, by suitably controlling the operation, to produce esters which are soluble in certain solvents and insoluble in others. Thus the ester may be soluble in acetone but insoluble in ethyl alcohol and water. It may be soluble in 75% ethyl alcohol but insoluble in 50% ethyl alcohol and water, or it may be soluble in all of the solvents mentioned, except acetone. The purpose for which the ester is to be used will govern the conditions of the reactions so that a product having characteristics notable for that purpose may be obtained.

Various changes may be made, therefore, in the procedure and the materials employed therein for the purpose of the invention, the examples herein presented being merely illustrative of the class of esters and of the methods of preparing them.

Having thus described our invention, what we claim as new and desire to secure by Letters Patent is:

1. A mixed cellulose ester including an acyl radical and a radical of an acid of the group consisting of mono and di-basic alpha hydroxy aliphatic acids.

2. A mixed cellulose ester including an acetyl radical and a radical of an acid of the group consisting of mono and di-basic alpha hydroxy aliphatic acids.

3. A mixed cellulose acyl ester prepared from a cellulose acyl ester in which an acyl radical has been substituted by a radical of an acid of the group consisting of mono and dibasic alpha hydroxy aliphatic acids.

4. A mixed cellulose ester containing acetyl groups prepared from cellulose acetate in which an acetyl radical has been substituted by a radical of an acid of the group consisting of mono and dibasic alpha hydroxy aliphatic acids.

5. A mixed cellulose ester comprising a partially hydrolyzed cellulose acetate in which an acetyl radical has been substituted for a radical of an acid of the group consisting of mono and dibasic alpha hydroxy aliphatic acids.

6. A water-soluble, mixed cellulose ester including an acetyl radical and a radical of an acid of the group consisting of mono and di-basic alpha hydroxy aliphatic acids.

7. A mixed cellulose ester including an acetyl radical and a radical selected from the group consisting of lactic, tartaric, glycollic, glyceric, mandelic, and malic acid.

8. A mixed cellulose ester containing an acetyl radical, said mixed ester including a radical selected from the group consisting of lactic, tartaric, glycollic, glyceric, mandelic and malic acid.

9. A method of preparing mixed cellulose esters which comprises reacting upon an acyl ester of cellulose with a concentrated acid selected from the group consisting of mono and di-basic alpha hydroxy aliphatic acids.

10. A method of preparing mixed cellulose esters which comprises reacting upon cellulose acetate with a concentrated acid selected from the group consisting of mono and di-basic alpha hydroxy aliphatic acids.

11. A method of preparing mixed cellulose esters which comprises reacting upon cellulose acetate with a concentrated acid selected from the group consisting of mono and di-basic alpha hydroxy aliphatic acids at a temperature of approximately 100° C.

12. A method of preparing mixed cellulose esters which comprises reacting upon cellulose acetate with a concentrated acid selected from the group consisting of mono and di-basic alpha hydroxy aliphatic acids, precipitating the mixed ester and separating and washing the precipitate.

13. A mixed cellulose ester including an acyl radical and a radical of a polyhydroxy aliphatic acid having the alpha position occupied by a hydroxy group.

14. A mixed cellulose ester including an acetyl radical and a radical of a polyhydroxy aliphatic acid having the alpha position occupied by a hydroxyl group.

15. A method of preparing mixed cellulose esters which comprises reacting upon an acyl ester of cellulose with a concentrated polyhydroxy aliphatic acid having the alpha position occupied by a hydroxyl group, the acid being a solvent of the cellulose acyl ester.

16. A method of preparing mixed cellulose esters which comprises reacting upon cellulose acetate with a concentrated polyhydroxy aliphatic acid having the alpha position occupied by a hydroxyl, the acid being a solvent of the cellulose acetate.

17. A mixed cellulose ester having acetic acid and lactic groups.

18. A mixed cellulose ester having acetic acid and tartaric acid groups.

19. A mixed cellulose ester having acetic acid and glycollic acid groups.

CYRIL J. STAUD.
CHARLES STERLING WEBBER.